United States Patent [19]
Asher

[11] Patent Number: 5,693,230
[45] Date of Patent: Dec. 2, 1997

[54] HOLLOW FIBER CONTACTOR AND PROCESS

[75] Inventor: William J. Asher, Half Moon Bay, Calif.

[73] Assignee: Gas Research Institute, Chicago, Ill.

[21] Appl. No.: 591,792

[22] Filed: Jan. 25, 1996

[51] Int. Cl.[6] ............................................. B01D 61/00
[52] U.S. Cl. ............... 210/650; 210/500.23; 210/321.8;
 210/321.78; 210/321.79; 210/502.1; 210/497.1;
 210/263; 95/46; 95/47; 96/10
[58] Field of Search ............. 210/500.23, 321.78,
 210/321.79, 321.8, 321.89, 321.9, 321.88,
 321.87, 502.1, 497.1, 263, 650; 95/45–46,
 47; 96/10

[56] References Cited

U.S. PATENT DOCUMENTS

| | | | |
|---|---|---|---|
| 3,612,282 | 10/1971 | Cheng | 210/321.9 |
| 3,956,112 | 5/1976 | Lee et al. | |
| 3,957,648 | 5/1976 | Roget et al. | 210/321.9 |
| 4,045,353 | 8/1977 | Rembaum et al. | 210/500.23 |
| 4,165,273 | 8/1979 | Azarov et al. | 210/321.87 |
| 4,172,794 | 10/1979 | Siegdell | 210/500.23 |
| 4,247,393 | 1/1981 | Wallace | 210/321.8 |
| 4,268,279 | 5/1981 | Shindo et al. | |
| 4,282,623 | 8/1981 | Lee | 210/321.78 |
| 4,425,234 | 1/1984 | Reitz | 210/500.23 |
| 4,784,768 | 11/1988 | Mathieu | 210/321.8 |
| 4,787,974 | 11/1988 | Ambrus et al. | 210/321.8 |
| 4,966,699 | 10/1990 | Sasaki et al. | |
| 5,013,437 | 5/1991 | Trimmer et al. | 210/321.78 |
| 5,041,220 | 8/1991 | Lee et al. | 210/321.8 |
| 5,104,425 | 4/1992 | Rao et al. | 95/47 |
| 5,139,668 | 8/1992 | Pan et al. | 210/321.8 |
| 5,186,832 | 2/1993 | Mancusi et al. | 210/321.8 |
| 5,198,110 | 3/1993 | Hanai et al. | 210/321.79 |
| 5,221,474 | 6/1993 | Yokono et al. | 210/500.23 |
| 5,264,171 | 11/1993 | Prasad et al. | 264/103 |
| 5,282,964 | 2/1994 | Young et al. | 210/321.8 |
| 5,284,584 | 2/1994 | Huang et al. | 210/321.6 |
| 5,449,457 | 9/1995 | Prasad | 210/500.23 |
| 5,472,613 | 12/1995 | Schofield | 210/634 |

*Primary Examiner*—Ana Fortuna
*Attorney, Agent, or Firm*—Speckman, Pauley & Fejer

[57] ABSTRACT

A hollow fiber contactor and process for fluid treatment having forced circulation with entry of fluid to be treated through the open ended lumen of a porous input hollow fiber having its opposite end closed and exit of treated fluid through the open ended lumen of an adjacent or nearby porous output hollow fiber having its opposite end closed. Fluid to be treated passes through the porous wall of an input hollow fiber, passes in contact with a treatment medium between the input and output hollow fibers forming treated fluid which passes through the porous wall of an output hollow fiber and exits the process. This invention provides high contact with treatment medium between the hollow fibers, especially suitable for selective sorption for gas purification or separation and for conduct of catalytic reactions.

26 Claims, 6 Drawing Sheets

HOLLOW FIBER CONTACTOR AND PROCESS

BACKGROUND OF THE INVENTION

1. Field of the Invention

This invention relates to a hollow fiber contactor and process having forced circulation with entry of fluid to be treated through the open ended lumen of a porous input hollow fiber having its opposite end closed and exit of treated fluid through the open ended lumen of an adjacent or nearby porous output hollow fiber having its opposite end closed. In the contactor of this invention fluid to be treated passes through the porous wall of an input hollow fiber, passes in contact with a treatment medium forming treated fluid which passes through the porous wall of an output hollow fiber, and exits the contactor. The contactor of this invention provides high contact with a treatment medium between the hollow fibers providing effective treatment at unexpectedly high flow rates resulting in contacting apparatus of greatly reduced size than prior contactors for the same fluid treatment. Hollow fiber contactors of this invention are especially suited for selective sorption, such as gas purification or separation, and for conduct of catalytic reactions.

2. Description of Related Art

A number of prior patents teach hollow fiber membranes for fluid treatment. U.S. Pat. No. 3,956,112 teaches hollow fiber non-porous membrane solvent extraction by passing a first liquid solvent through lumen of hollow fiber membranes and a solute in a second solvent, which is immiscible with the first solvent, through the space surrounding the hollow fiber membranes, the solute diffusing across the solvent swollen membrane to the first solvent without intermixing the two liquids. U.S. Pat. No. 4,268,279 teaches microporous hollow fibers with a liquid in the lumen and a fluid outside the fiber allowing gaseous components to transfer through the microporous fiber to the inside or outside of the fiber. U.S. Pat. No. 4,966,699 teaches a hollow fiber membrane fluid processor providing counter current flow of fluid in the fiber lumen and the fluid surrounding the outside of the fibers from one end of the fiber bundle to the other. U.S. Pat. No. 5,041,220 teaches hollow fiber filter cartridges wherein one end of the encapsulated potted fibers is opened and the other end of the encapsulated potted fibers may be opened or left potted. U.S. Pat. No. 5,198,110 teaches a bundle of permselective hollow fibers having a plurality of filaments extending substantially lengthwise over the length of the exterior of each hollow fiber.

Spiral wound hollow fiber membrane fabric-like cartridges for phase contact applications having a turbulence promoting web in which the hollow fibers in the array are arranged in a single mutually parallel layer facing one side of and at least intermittently bonded across their full lengths to the web which is co-extensive with the entire layer of hollow fibers are taught by U.S. Pat. No. 5,186,832. U.S. Pat. No. 5,264,171 teaches spiral wound hollow fiber membrane fabric-like cartridges for phase contact applications having baffles that induce radial feed flow in the shell side of the hollow fiber membrane bundle. U.S. Pat. No. 5,284,584 teaches hollow fiber membrane fabric-like cartridges and modules for phase contact applications having tube sheets, isolating the lumen-side and shell-side portions of the cartridge or module, providing improved solvent resistance and mechanical durability by simultaneously with winding of the array of hollow fibers extruding a molten, high strength, solvent resistant thermoplastic resin onto each of the bundle ends to pot each of the bundle ends in the resin.

Various flow patterns through bundles of hollow fiber systems have been suggested. U.S. Pat. No. 5,013,437 teaches a bundle of hollow fiber membranes partitioned into multiple stages of concentric annular regions, each providing counter current flow of a feed and a nonpermeate with a permeate. U.S. Pat. No. 5,139,668 teaches a hollow fiber bundle having two sets of passageways, the lumina of the fibers and the space between the fibers, wherein one set of passageways is filled with solid particles in sealed fashion except for the microporous walls, and the second set of passageways is open for passage of the process streams. U.S. Pat. No. 5,221,474 teaches a transfusion filter for removal of gas bubbles having centrally located closed ended hydrophilic porous hollow fibers in a chamber of inlet process fluid with the opposite ends of the hydrophilic porous hollow fibers serving as the treated fluid output and having outer annularly arranged closed ended hydrophobic porous hollow fibers surrounding the hydrophilic fibers in the chamber with the opposite open ends of hydrophobic fibers open to the atmosphere for discharge of gas. U.S. Pat. No. 5,282,964 teaches hollow fiber bundles having improved counter current flow of fluids in the fiber lumina and outside the fiber by parallel flow of feed fluid mixture through a plurality of fiber bundles, each bundle enclosed in a separate enclosure and having a radial Peclet number of less than about 30.

SUMMARY OF THE INVENTION

The hollow fiber contactor and process of the present invention provides more effective contacting, therefore, allowing higher rates of fluid flow, enabling purification of a mixture of gases, such as natural gas, at many times the rate of the same size presently used apparatus. Alternatively, the same rate of fluid flow may be processed in a significantly smaller apparatus.

The fluid flow system of this invention provides entry of fluid to be treated through the lumen of input hollow porous wall fibers and exit of treated fluid through the lumen of adjacent or close output hollow porous wall fibers. The apparatus of this invention comprises a plurality of input hollow fibers closed at one end and a plurality of output hollow fibers closed at one end, the input hollow fibers and the output hollow fibers being spaced within a treatment medium, such as sorbent or catalyst particles. The inlet for fluid to be treated is in communication with the open end of the input hollow fibers while the treated fluid outlet is in communication with the open end of the output hollow fibers. The input hollow fibers have walls within the treatment medium porous to the fluid to be treated and the output hollow fibers have walls within the treatment media porous to treated fluid. The input and output hollow fibers are spaced within the treatment medium such that the fluid to be treated passes through the porous walls of the input hollow fibers to contact the treatment medium forming treated fluid which passes through the porous walls of the output hollow fibers for discharge from the contactor.

BRIEF DESCRIPTION OF THE DRAWINGS

The above and further objects and advantages of the invention will become apparent upon reading the preferred embodiments together with reference to the drawings, wherein.

3

Figure 3:
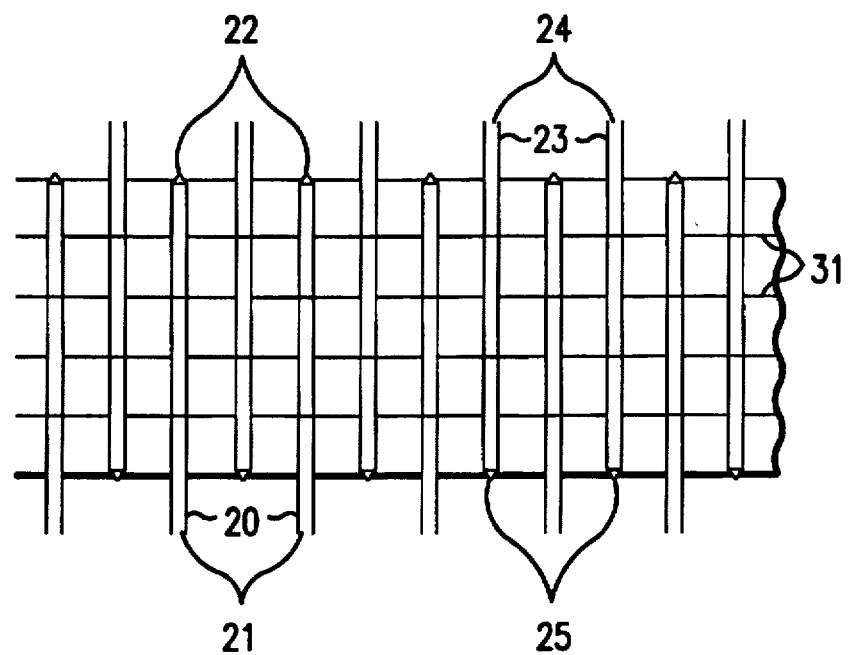
Figure 4:
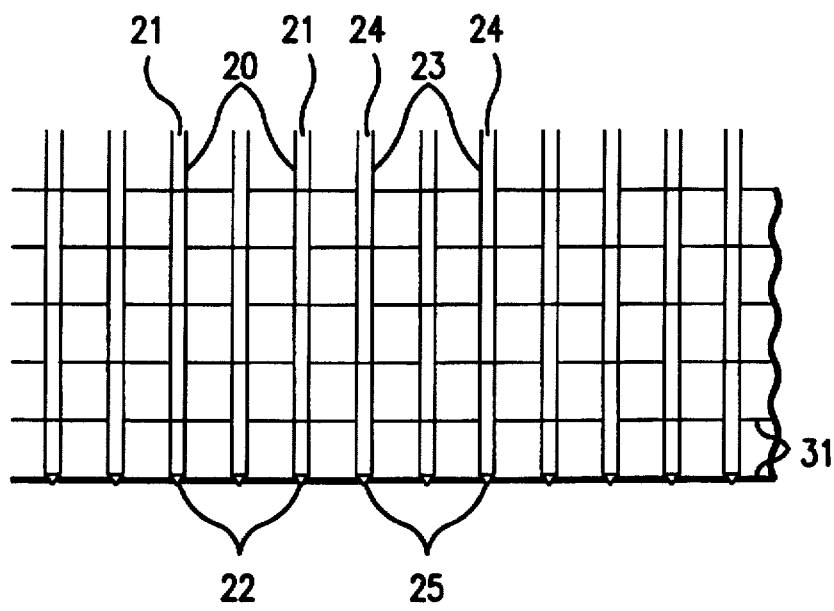
Figure 5:
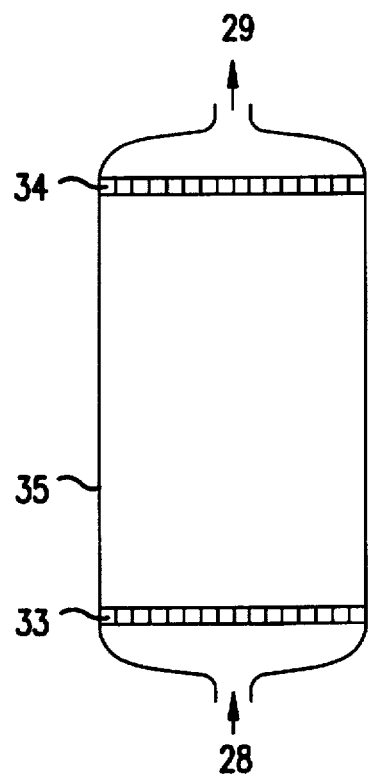
Figure 6:
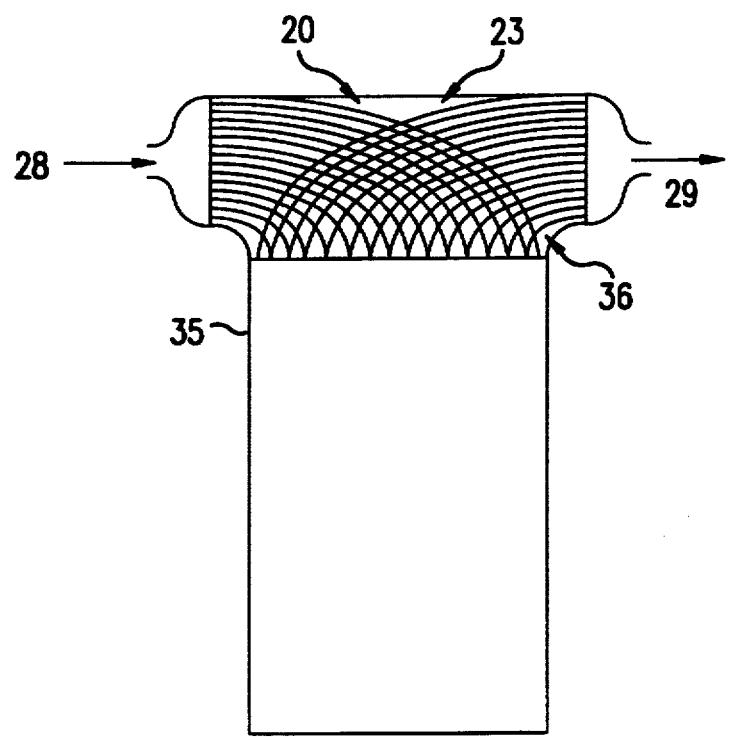
Figure 7:
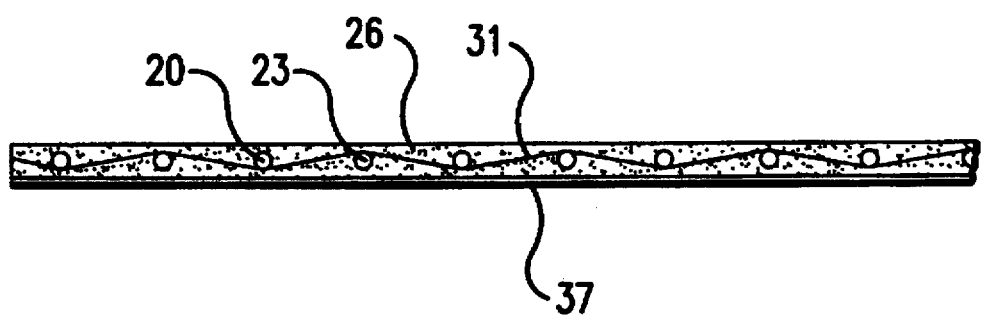
Figure 8:
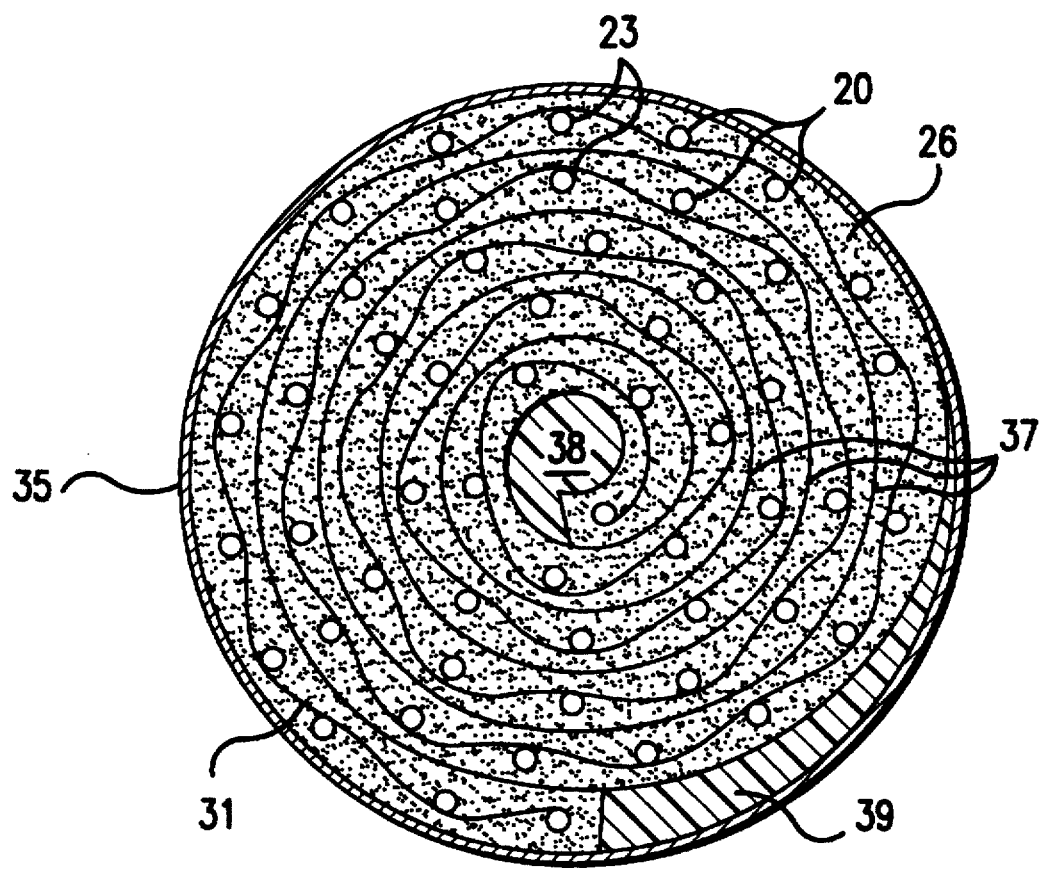
Figure 9:
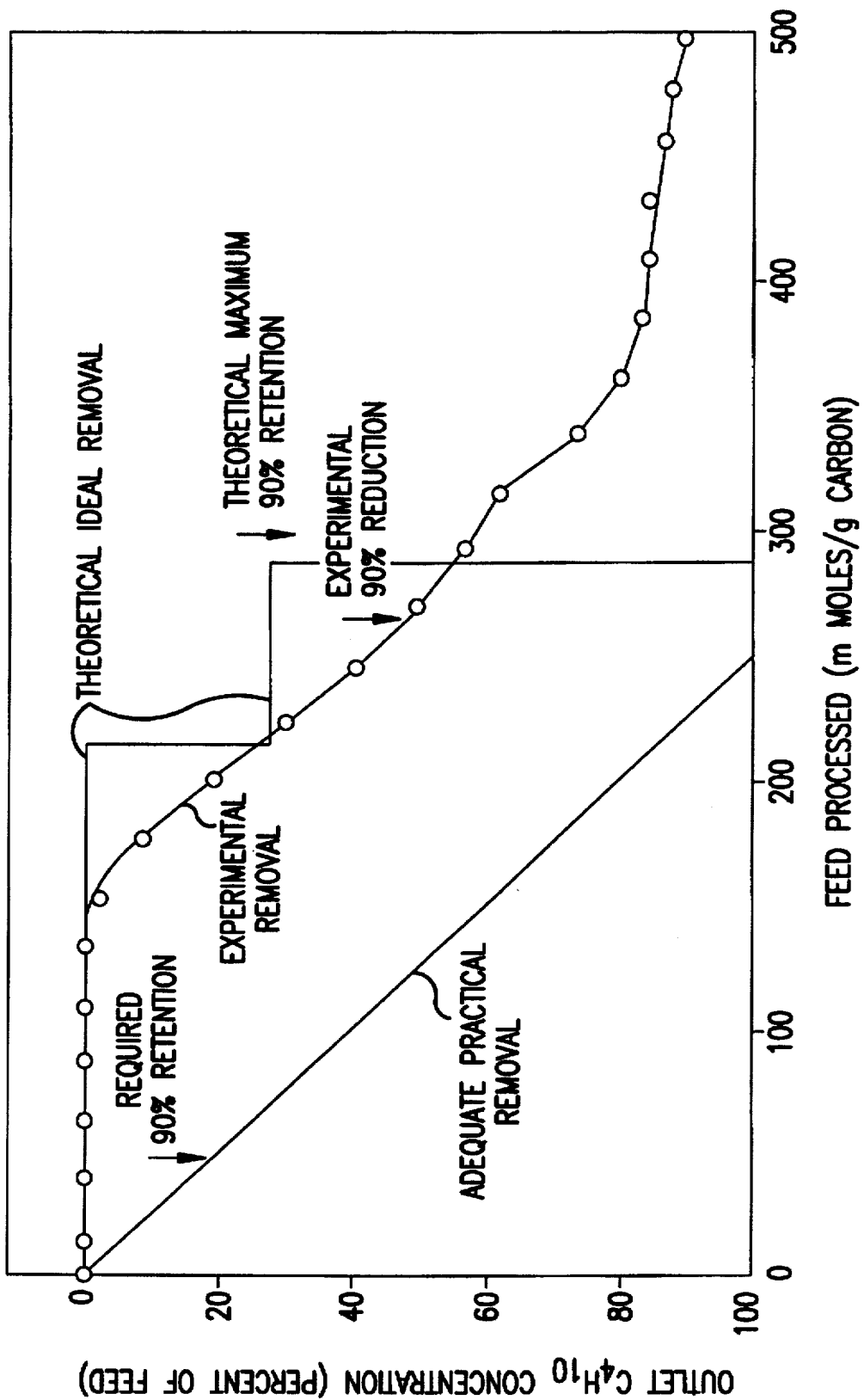

FIG. 3 is a schematic showing of a woven structure of hollow fibers and solid fibers according to one embodiment of this invention;

FIG. 4 is a schematic showing of a woven structure of hollow fibers and solid fibers according to another embodiment of this invention;

FIG. 5 is a schematic showing of fluid flow through a contactor containing a woven structure as shown in FIG. 3;

FIG. 6 is a schematic showing of fluid flow through a contactor containing a woven structure as shown in FIG. 4;

FIG. 7 is a cross sectional view of a woven structure of hollow fibers and solid fibers according to one embodiment of this invention;

FIG. 8 is a cross sectional view of a spiral structure of rolled woven hollow fibers and solid fibers according to one embodiment of this invention; and FIG. 9 is a plot of treated fluid butane concentration showing separation from a mixture of methane and butane, as described in the Example.

DESCRIPTION OF PREFERRED EMBODIMENTS

Figure 1:
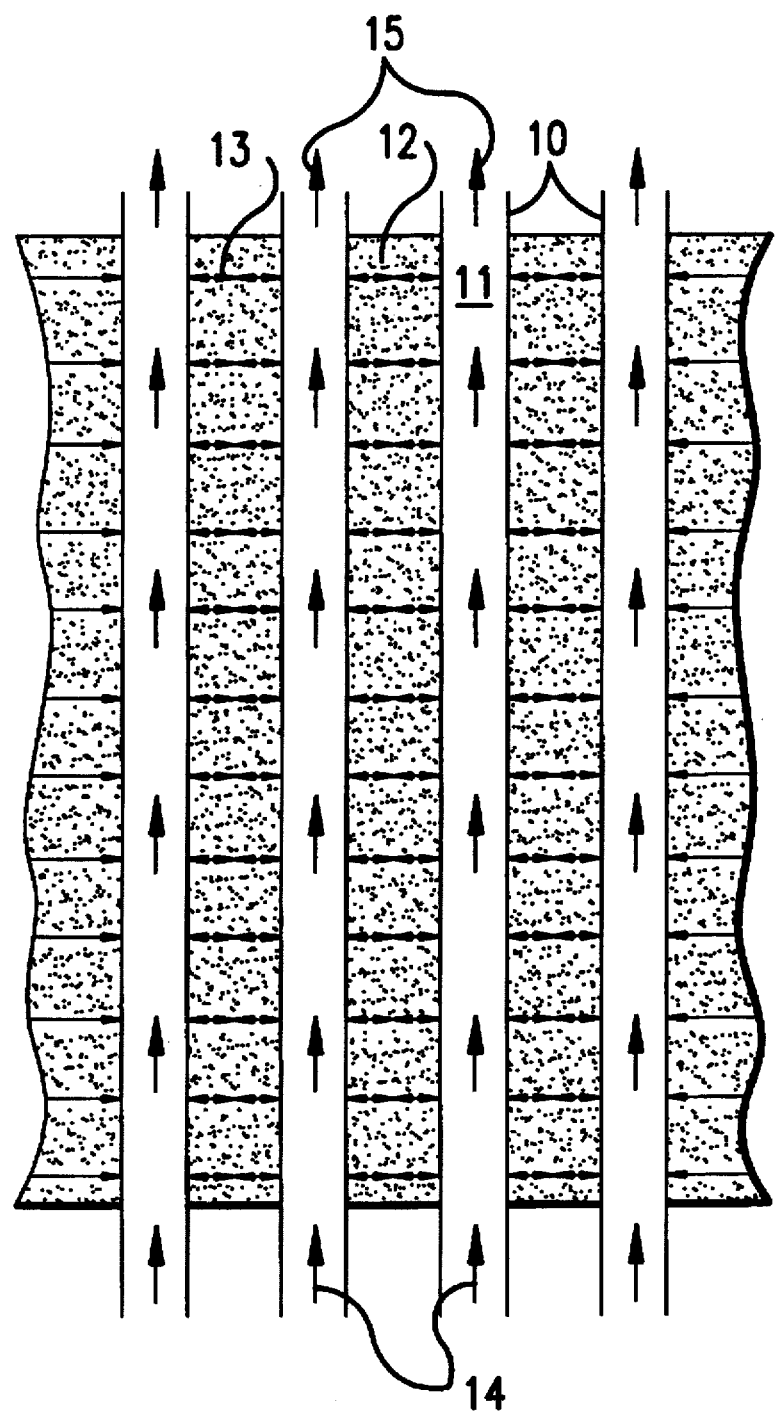
FIG. 1 shows fluid flow patterns in prior art hollow fiber contactors.

FIG. 1 illustrates fluid flow during the high pressure flow step of a typical pressure swing adsorption cycle in conventional prior art hollow fiber sorbent contactors. Such devices are used to treat a fluid flowing through lumen passageways with a sorbent outside the hollow fibers. Hollow fibers 10 extend in spaced relation through sorbent bed 12. Lumen 11 of all hollow fibers 10 are open on both ends with fluid to be treated entering the lumen as shown by arrows 14 and treated fluid leaving the lumen at their opposite ends as shown by arrows 15. The fluid being treated flows into and out of all of the lumen passageways of all the hollow fibers 10. The material to be sorbed out of the fluid to be treated is transported through the walls of microporous hollow fibers 10 and contacts sorbent in sorbent bed 12 by molecular diffusion as shown by arrows 13.

Figure 2:
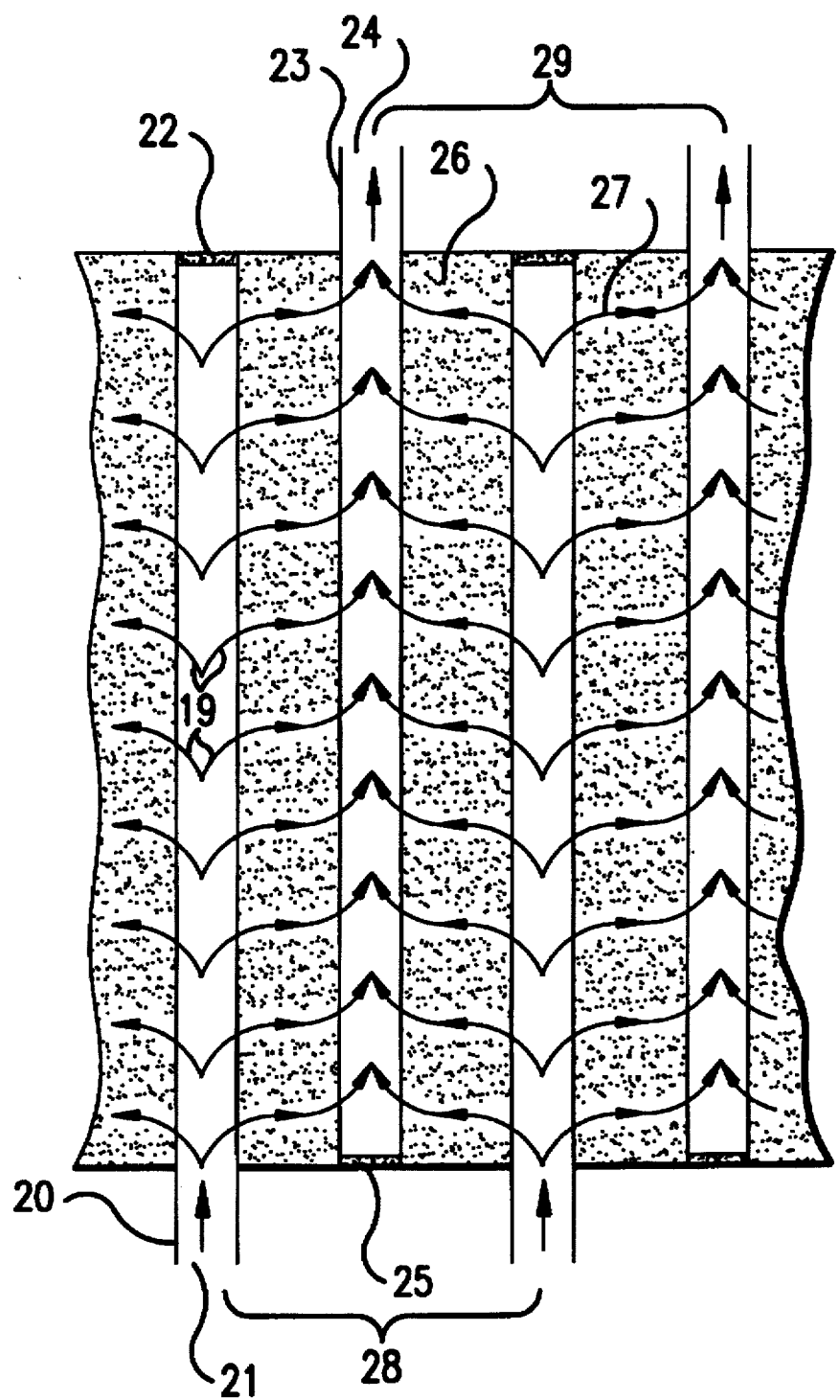
FIG. 2 shows fluid flow patterns in hollow fiber contactors according to one embodiment of this invention.

FIG. 2 illustrates fluid flow during the high pressure flow step of a high pressure swing adsorption cycle according to one embodiment of this invention. Input hollow porous wall fibers 20 have closed ends 22 and opposite open ends 21. Output hollow porous wall fibers 23 have closed ends 25 and open ends 24. Input hollow fibers 20 and output hollow fibers 23 extend in alternate spaced relation through a treatment medium bed 26, such as a sorbent bed. Open ends 21 of lumen of input hollow fibers 20 are all located at one end of sorbent bed 26 to receive fluid to be treated as shown by arrows 28 with opposite closed ends 22 of the lumen. Open ends 24 of lumen of output hollow fibers 23 are all located at the opposite end of sorbent bed 26 for the exit of treated fluid as shown by arrows 29 with opposite closed ends 25 of the lumen. Fluid to be treated flows into lumen passageways of only input hollow fibers 20, as shown by arrows 28, and out of lumen passageways of only output hollow fibers 23, as shown by arrows 29. The fluid, with the material to be treated, such as by selective sorption, passes through the microporous walls of the input hollow fibers 20, through treatment medium bed 26, where separated material is selectively sorbed from the fluid that had contained it, and the treated fluid then passes through the microporous walls of the output hollow fibers 23, as shown by arrows 19. The fluid flow paths obtained in the process and apparatus of this invention provide forced flow of the fluid being treated from the lumen of the input hollow fibers, through the treatment medium, and into the lumen of the output hollow fibers, thereby providing better and more positive contact between the material to be treated and the treatment medium.

Use of the fluid flow patterns according to this invention, as shown in FIG. 2, provides unexpectedly high sorption efficiency. For example, it can be calculated that purification of natural gas using the contactor of this invention may be effected in the order of 100 times the rate obtained by use of the contactor shown in FIG. 1. The very high sorption efficiency of the contactor, as shown in FIG. 2, allows use of small sized contactors while achieving high efficiency selective sorption.

Hollow fiber contactors according to this invention may be arranged in different configurations, an important feature being that all of the hollow fibers have one end closed. Using hollow fibers with one end closed provides forced fluid flow through the contactor by the fluid to be treated entering through an input hollow fiber, passing over a treatment medium forming treated fluid, and discharging treated fluid through an output hollow fiber. A plurality of input and output hollow fibers having closed ends are spaced within a treatment medium. A hollow fiber contactor for treatment of fluid according to this invention comprises a plurality of input hollow fibers closed at one end and a plurality of output hollow fibers closed at one end. The input hollow fibers and the output hollow fibers are spaced within a treatment medium, the input hollow fibers having walls within the treatment medium porous to fluid to be treated for passage of such fluid to be treated to the treatment medium and the output hollow fibers having walls within the treatment medium porous to treated fluid for discharge of treated fluid. The input and output hollow fibers are spaced within the treatment medium such that the fluid to be treated passes through porous walls of the input hollow fibers to contact the treatment medium, forming treated fluid and the treated fluid passes through porous walls of the output hollow fibers for discharge from the contactor. While the input hollow fibers and the output hollow fibers may be placed randomly, or in many other placements with respect to each other, in preferred embodiments the input hollow fibers and output hollow fibers that are in flow communication are placed alternately, as is disclosed in further detail herein.

A process for treatment of fluid according to this invention comprises passing fluid to be treated into the open end of lumen of a plurality of input hollow fibers having the lumen closed their opposite ends and having walls porous to the fluid to be treated within a treatment medium. The fluid to be treated is passed through the porous walls of input hollow fibers and contacts the treatment medium forming treated fluid which is passed through the walls of a plurality of output hollow fibers having one closed end and spaced within the treatment medium from the input hollow fibers. The output hollow fibers have an opposite open end for exit of the treated fluid and walls porous to the treated fluid within the treatment medium.

Suitable hollow fibers for use in this invention have side walls with a viscosity normalized permeance of at least $1\times10^{-4}$ liter cp/cm$^2$ min bar, preferably greater than about $1\times10^{-2}$ liter cp/cm$^2$ min bar, and most preferably greater than about $1\times10^{-1}$ liter cp/cm$^2$ min bar, and in all cases having pores small enough to prevent passage of treatment particles through the walls. Generally, the thickness of the porous walls of the hollow fibers is about 5 to about 25 percent of their outside diameters. The hollow fibers may be made of any suitable material which is not chemically reactive with the fluid flowing through the lumen or the particles surrounding the outside of the hollow fiber, such as, polypropylene, polysulfone, Teflon, and sintered powdered metal such as stainless steel. Such hollow fibers are known and available and the choice will be apparent to one skilled in the art dependent upon the particular application and size of the contactor. The hollow fibers may be appropriately sized for specific applications and contactor sizes, as will be apparent to one skilled in the art.

The treatment medium for use in this invention may be a single material or a plurality of materials used in fluid contact processes, such as sorbents and catalysts for chemical reactions. For example, suitable sorbents may be used, such as, for purification of natural gas activated carbon may be used to remove high carbon number components (natural gas liquids); silica gel may be used to remove acid gases ($H_2S$ and $CO_2$), natural gas liquids, water, and water plus natural gas liquids; Zeolite molecular sieves may be used to remove acid gases, water, and natural gas liquids. For treatment of air, sorbents such as Zeolite molecular sieves may be used to remove nitrogen and carbon molecular sieves may be used to remove oxygen. Other sorbents, as will be apparent to one skilled in the art, may be used for other sorption separation processes. The treatment medium may be a catalytic material which catalyzes reaction between components of a mixed input fluid. The apparatus and process of this invention is particularly useful when it is desired to use small catalyst particles, such as to avoid slow diffusion into large porous catalyst particles. Such catalytic reactions include reactions such as, for example, hydrogenation of petroleum fractions or animal or vegetable fats using catalyst particles having largest dimensions of less than about 1 mm and the Friedel-Craft ketone synthesis, for example, the reaction catalyzed by heterogeneous aluminum chloride catalyst starting with aryl halides and an aromatic to form mono aryl ketones or starting with aroyl halides to form diaryl ketones.

Suitable spacing of the hollow fibers in the treatment medium is from about the outside diameter of the hollow fiber to about 100 times this diameter, preferably about 1 to about 30 times the outside hollow fiber diameter.

One embodiment of assembly of input hollow fibers having one closed end and output hollow fibers having one closed end are in a woven sheet structure as shown in FIG. 3. Input hollow fibers 20 are configured with their open ends 21 facing in a first direction (downward) and their closed ends 22 facing in an opposite second direction (upward) with alternate output hollow fibers 23 oppositely configured with their open ends 24 facing in the second direction (upward) and their closed ends 25 facing in the first direction (downward). A woven sheet structure is formed by weaving fibers or filaments 31 in woven relationship with alternating input hollow fibers 20 and output hollow fibers 23. Preferably, the weaving fibers are substantially smaller diameter than the hollow fibers. While the weaving fibers are preferably single solid fibers, weaving fibers of conventional formed thread may also be used. Weaving fibers 31 may be of any material which is non-reactive with the treatment medium and the walls of the input and output hollow fibers and may be the warp or the woof of the weave with the hollow fibers being the opposite. Exemplary materials for the weaving fibers are plastic or metallic materials inert to the fluids being treated and to the treatment medium, such as, polypropylene, steel, and stainless steel. It is preferably that the hollow fibers be maintained in an equal spacing which may be accomplished by coating the weaving fibers with an adhesive so that the hollow fibers will adhere to the weaving fibers where they intersect and contact. Alternatively, the woven assembly can be heated to soften the fibers enough so that they adhere at the contact points. FIG. 5 schematically shows the input and output flow in one embodiment of an alternate side flow type contactor suitable for a woven sheet structure as shown in FIG. 3, having all input lumen open to one side and all output lumina open to the opposite side. The input hollow fibers pass through a seal in the input end seal 33 and the output hollow fibers pass through a seal in the output end seal 34. The enclosed space between the hollow fibers, input end seal 33, output end seal 34, and containment vessel 35 is packed with a desired treatment medium. Fluid to be treated passes into the input manifold section of containment vessel 35 as indicated by arrow 28, passes into the lumen of input hollow fibers 20, through the porous walls of input hollow fibers 20, passes in contact with treatment medium between the hollow fibers forming treated fluid, the treated fluid passes through the porous walls of output hollow fibers 23 and is transported through their lumen to treated fluid output manifold section of containment vessel 35, and exits containment vessel 35 as indicated by arrow 29.

In another embodiment of assembly of input and output hollow fibers having one closed end according to this invention, all open ends may be faced in the same direction, as shown in FIG. 4 schematically showing input and output fluid flow. FIG. 4 shows input hollow fibers 20 configured with their open ends 21 facing in one direction and alternate output hollow fibers 23 configured with their open ends 24 facing in the same direction. In similar manner as described above, a woven sheet structure is formed by weaving fibers or filaments 31 in woven relationship with alternating input hollow fibers 20 and output hollow fibers 23. For assembly into a contactor, as shown in FIG. 6, the open ends of the hollow fibers extend beyond the woven structure to be directed to a suitable manifold. The open ends of the hollow fibers extending beyond the woven structure, as shown schematically in FIG. 6, pass through a seal in end seal 36 to form separated intake and output manifolds. The enclosed volume between the hollow fibers, end seal 36, and containment vessel 35 is packed with a desired treatment medium. Fluid to be treated passes into the input manifold as indicated by arrow 28, passes into the lumen of input hollow fibers 20, through the porous walls of input hollow fibers 20, passes in contact with treatment medium between the hollow fibers forming treated fluid, the treated fluid passes through the porous walls of output hollow fibers 23 and is transported through their lumen to treated fluid output manifold section of containment vessel 35, and exits containment vessel 35 as indicated by arrow 29.

The woven structure of input and output hollow fibers, as shown schematically in FIGS. 3 and 4, is preferably assembled into a composite sheet structure, including a layer of treatment medium on a barrier sheet which is non-permeable to fluid to be treated and treated fluid, as shown in cross section in FIG. 7. Barrier sheet 37, which is non-permeable to the fluid to be treated and the treated fluid, is coated on one side with a layer of treatment medium and the woven structure with alternating input hollow fibers 20 and output hollow fibers 23 woven with weaving fibers 31 is embedded in the central portion of the thickness of treatment medium 26. The adjacent hollow fibers in this structure are in flow communication through the medium because the barrier sheet does not pass between them. This structure may be rolled into a spiral where the non-permeable barrier sheet prevents undesired flow communication between fibers in different layers of the spiral. The woven structure may be embedded in a sheet of treatment medium which is then laid over the barrier sheet. In another embodiment, particles of a porous treating material may be poured over the woven structure lying on the barrier sheet in a horizontal plane and the particles then spread into a layer of uniform thickness. When fabricating the contactor using some types of porous particles, it is possible to form the spiral structure by keeping the unrolled portion of the layers in a horizontal plane and rolling the spiral portion of the device over the horizontal layer into the spiral structure, analogous to rolling up a rug while it is lying on the floor. Other types of particles will tend to fall off the edges of the horizontal layer to an excessive degree. This can be avoided by adding a sufficient quantity of liquid to just fill the interparticle voids resulting in a mixture of particles and liquid in a paste form which does not flow. The liquid selected must wet the surfaces of the particles, such as water or an organic solvent, depending upon the particles, and must have a significant vapor pressure so that after the spiral device is formed by rolling up the layers, the liquid can be removed by evaporation. This procedure leaves only particles of the treating material and the woven structure in the space between layers of the barrier sheet. For some applications, it is desirable to have the particles of treating material in fixed, locked positions relative to each other. For such applications, the external surfaces of the particles can be coated with an adhesive, such as, for example, epoxy or cyano-acrylic, that will allow sufficient time for fabrication of the device before locking the particles into a fixed position. Such an adhesive must not significantly block the pore structure of the sorbent or catalyst.

The treatment medium comprises solid particles larger than the pores in the input or output hollow fibers. Preferably, the solid particles are porous to provide a high surface area for fluid contact to result in high efficiency chemical reactions. The treatment medium may comprise a single or plurality of materials suitable for the desired contact treatment. For example, selective sorbents may be used to selective sorb one or more materials from a fluid, such as purifying natural gas, separation of oxygen from air, and other known sorption processes. Likewise, the contactor of this invention may advantageously be used to promote catalytic reactions by use of a catalyst as the treatment medium. The distance between adjacent hollow fibers, that is, the thickness of the layer of treatment medium, is suitably about 1 to about 100 fiber outside diameters, preferably about 3 to about 30 fiber diameters.

In one embodiment of this invention, the composite sheet of a barrier sheet and treatment medium with embedded woven structure of alternating input and output hollow fibers is rolled into a spiral, as shown in the schematic cross section of FIG. 8. Solid core 38, non-permeable to the gas to be treated and treated gas and substantially non-reactive with any of the components, may be used as an aid in forming the spiral. It also may be advantageous to wet the treatment medium to hold particles of treatment media in a stable interposition to each other as the spiral is being formed. The wetting fluid and the binding material may be removed, such as by vaporization or solution, before the device is used. The formed spiral of the composite sheet structure of barrier sheet 37, treatment media 26, and embedded woven sheet of alternating input hollow tubes 20 and output hollow tubes 23 woven with solid fibers 31 may be placed in containment vessel 35 with the excess space between the exterior of the spiral and the containment vessel filled with shell seal 39 to prevent flow in this space. Shell seal 39 should be non-pervious to gas to be treated and treated gas, as well as substantially non-reactive with any components of the system. Suitable materials for the seal are any poured or cast sealing materials inert to the fluids being processed, such as, for example, butyl rubber and epoxy resin. The solid core may be any plastic or metallic material inert to the fluids being processed, such as polypropylene, steel or stainless steel. It is seen that with the configuration shown in FIG. 8, fluid flow paths will be established through treatment medium 26 between adjacent input and output hollow fibers to promote good contact with the treatment medium for high reaction rates and provide very high pass through flow rates.

Either the alternate side communication contactor configuration, as shown in FIGS. 3 and 5, or the single side communication configuration, as shown in FIGS. 4 and 6, may be used in the spiral sheet configuration, as shown in FIG. 8. Generally, when the flow path through the lumen of the hollow fiber is greater than about 100 times the inside diameter of the hollow fiber the alternate side communication contactor will provide better performance, and when that flow path is less than about 100 the single side communication contactor provides better performance.

Many specific parameters of the process of this invention, using the improved contactor, are determined by the particular application, such as, for example, pressure swing adsorption and catalytic processes. The temperature, pressure, specific treatment material, flow rates per unit mass of treatment material, cycle times, and the like, for specific applications are quite different and can be ascertained by one skilled in the art. Optimum cycle times can be ascertained by progressively reducing the cycle time for the process, while keeping all other parameters substantially constant, until a substantial decrease in performance is measured. The cycle time of the process of this invention will be reduced by a factor of about 2 to 200, as compared with the cycle time using a conventional contactor as shown in FIG. 1, and usually by a factor of about 4 to about 50. It should be noted that the rate of production of treated product per unit of treatment material is directly proportional to the reduction in cycle time factor.

EXAMPLE

Good separation of butane from a mixture of methane and butane was achieved using the flow paths according to this invention by assembling in a reactor vessel ten hollow fibers in the configuration as shown in FIG. 3. The hollow fibers were spaced in an active treatment zone which was 0.1 inch deep, approximately the outside diameter of the hollow fibers. The hollow fibers were held at a distance of 0.42 inch between the fibers by sealing devices at each end of the active treatment zone. An input fiber was at one outside edge of the active zone and an output fiber at the other outside edge of the active zone, making the total active treatment zone 4.78 inches wide. Each of the hollow fibers had a length of 6.25 inches in the active treatment zone. The hollow fibers were porous polypropylene with an outside diameter of 1.6 mm and a 0.4 mm wall thickness available from Akzo under the registered trademark Accurel. The viscosity normalized permeance for the walls of these hollow fibers was measured, using methane at 30 psig and ambient temperature, and found to be $5.60 \times 10^{-3}$ liters $cp/cm^2$ min bar. Five of the hollow fibers were input fibers used to introduce gas to be treated and the other five alternately arranged hollow fibers were output fibers used to withdraw treated gas. The ten hollow fibers thus defined 9 interior subzones with input gas flow going into the lumens of the input fibers and exiting through the walls of these fibers, then passing through the treatment medium in the subzones, and then passing through the walls of the output fibers and removed from the lumens of the output fibers, as shown in FIG. 2. This treatment zone represents one layer of a contactor that could be rolled up as shown in FIGS. 7 and 8 to form a contactor as shown in FIG. 5.

Treatment medium particles were poured between the hollow fibers which also limited fiber movement. The treatment medium was 18.7 gms of activated carbon having a mean particle diameter of 0.44 mm available as 267-R-95 from Westvaco Corp., Covington, Va. 24426. The carbon was first equilibrated by passing an input of pure methane through the apparatus at ambient temperature while maintaining the outlet pressure at 30 psig. The input gas was then switched to 2 mole percent butane in methane and flowed through the apparatus at a rate of 4.75 liters at STP/minute at ambient temperature with the outlet pressure maintained at 30 psig. The composition of the output gas was continuously monitored using a thermal conductivity instrument.

The ideal result of flow through any subzone of the contactor, assuming perfect flow distribution and infinite rates of transport and infinitely strong adsorption of the butane on the activated carbon, would be zero concentration of butane in the output gas as progressively more input gas was processed until the carbon was saturated with butane. At that point, the butane concentration in the output gas would instantaneously increase to 100 percent of the input gas butane concentration. The apparatus used in this Example had nine subzones. The flow rates throughout the different subzones, that were all exposed to the same differential pressure of the total treatment zone, could be controlled by the resistance to flow through the walls of the hollow fibers or by the resistance to flow through the bed of particles of activated carbon. If the flow were controlled by resistance of flow through the bed of carbon particles, the flow through each of the subzones would be the same, because the geometry of the carbon particles in each of the subzones was identical. However, if the flow rates were controlled by the resistance of flowing through the walls of the hollow fibers, the flows through the two outer subzones would be greater since they each have one hollow fiber which has its total peripheral area available for flow, while each of the interior hollow fibers have flow into or out of two subzones, and thus, have only one half of their peripheral area available for flow into or out of each of these subzones. The increased hollow fiber peripheral area in the outer subzones results in higher flow rate through these subzones. Thus, the carbon in the outer two subzones is exposed to butane more rapidly and that carbon would reach saturation sooner than the carbon in the interior subzones. Therefore, the output flow from the outside subzones would contain 100 percent concentration of butane after they were saturated, while the butane concentration in the output from the interior hollow fibers would still be zero, causing an increase in the butane concentration of the combined outputs leaving the apparatus. Using the apparatus, as described above in this Example, resistance to flow measurements were made with and without the carbon particle bed in the apparatus and clearly showed that the flows were controlled by resistance to flow through the walls of the hollow fibers. Thus, 2 of the 9 subzones would have a high butane concentration causing a significant increase in the combined butane output concentration. However, in a commercial size apparatus with more than 1000 subzones, the 2 outside subzones would produce an insignificant increase in the combined output concentration.

The removal of butane from a mixture of methane and butane using the apparatus and process conditions as described in this Example is shown in FIG. 9. FIG. 9 shows the projected theoretical ideal removal, assuming perfect flow distribution and infinite rates, showing the stepped increase of the concentration of butane leaving the apparatus. FIG. 9 also shows a plot of the actual butane removal obtained using the apparatus of this invention under the conditions set forth above in this Example. The measured performance comes as close to the theoretical ideal performance as could be expected using a real adsorbent with actual transport rates, rather than infinite. This clearly demonstrates that the flow path of fluid obtained by this invention provides extremely effective contacting and treatment of a fluid stream flowing through an apparatus of this invention. Also shown in FIG. 9 is the much lower performance which we would project to be adequate for practical, economic commercial use.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. A process for treatment of fluid in a hollow fiber contactor, comprising: passing fluid to be treated into open ends of lumen of a plurality of input hollow fibers having opposite closed ends and walls porous to said fluid to be treated, each input hollow fiber substantially surrounded by a treatment medium; passing said fluid to be treated through said porous walls of said input hollow fibers and contacting said treatment medium forming treated fluid; passing said treated fluid through the walls of a plurality of output hollow fibers, each output hollow fiber having one open end and an opposite closed end, adjacently spaced from an input hollow fiber and substantially surrounded by said treatment medium, said output hollow fibers having walls porous to said treated fluid within said treatment medium; and collecting treated fluid from open ends of lumen of said output hollow fibers.

2. A process for treatment of fluid in a hollow fiber contactor according to claim 1 wherein said input hollow fibers are in alternately spaced relation with said output hollow fibers.

3. A process for treatment of fluid in a hollow fiber contactor according to claim 1 wherein said fluid to be treated passes into said open ends of lumen of a plurality of input hollow fibers at one end of said contactor and treated fluid passes from said open ends of lumen of said output hollow fibers at the opposite end of said contactor.

4. A process for treatment of fluid in a hollow fiber contactor according claim 1 wherein said fluid to be treated passes through an input manifold into said open ends of lumen of a plurality of input hollow fibers at one end of said contactor and treated fluid passes from said open ends of lumen of a plurality of output hollow fibers through an output manifold at the same end of said contactor.

5. A process for treatment of fluid in a hollow fiber contactor according to claim 1 wherein said fluid to be treated passes into said open ends of lumen of a plurality of input hollow fibers and treated fluid passes from said open ends of lumen of said output hollow fibers, said input hollow fibers spaced in alternate substantially parallel relation with said output hollow fibers, and a plurality of substantially smaller diameter fibers in woven relationship with said input and output hollow fibers forming a woven sheet structure.

6. A process for treatment of fluid in a hollow fiber contactor according to claim 1 wherein said fluid to be treated is air and said treatment medium is a sorbent for sorption of nitrogen from said air.

7. A process for treatment of fluid in a hollow fiber contactor according to claim 1 wherein said fluid to be treated is air and said treatment medium is a sorbent for sorption of oxygen from said air.

8. A process for treatment of fluid in a hollow fiber contactor according to claim 1 wherein said fluid to be treated passes into said open ends of lumen of a plurality of input hollow fibers and treated fluid passes from said open ends of lumen of said output hollow fibers, said input hollow fibers and said output hollow fibers spaced in alternate substantially parallel relation with a plurality of substantially smaller diameter fibers in woven relationship with said input and output hollow fibers forming a woven sheet structure, said woven sheet structure having an adjacent barrier sheet non-permeable to fluid to be treated and to treated fluid, said woven sheet and barrier sheet forming a composite sheet structure, said fluid to be treated passing in contact with said treatment medium between adjacent said composite sheets.

9. A process for treatment of fluid in a hollow fiber contactor according to claim 1 wherein said fluid to be treated passes into said open ends of lumen of a plurality of input hollow fibers and treated fluid passes from said open ends of lumen of said output hollow fibers, said input hollow fibers and said output hollow fibers spaced in alternate substantially parallel relation with a plurality of substantially smaller diameter fibers in woven relationship with said input and output hollow fibers forming a woven sheet structure, said woven sheet structure having an adjacent barrier sheet non-permeable to fluid to be treated and to treated fluid forming a composite sheet structure, said fluid to be treated passing in contact with said treatment medium between adjacent said barrier sheets in a spiral wound composite woven sheet structure.

10. A process for treatment of fluid in a hollow fiber contactor according to claim 9 wherein said treatment medium is a catalyst for conduct of a catalytic chemical reaction.

11. A process for treatment of fluid in a hollow fiber contactor according to claim 9 wherein said treatment medium is a sorbent for a pressure swing adsorption process.

12. A process for treatment of fluid in a hollow fiber contactor according to claim 11 wherein said fluid is natural gas.

13. A hollow fiber contactor for treatment of fluid comprising: a plurality of input hollow fibers open at one end and closed at their opposite end and a plurality of output hollow fibers open at one end and closed at their opposite end, each input hollow fiber and each output hollow fiber substantially surrounded by a treatment medium; said input hollow fibers having walls within said treatment medium porous to fluid to be treated and said output hollow fibers having walls within said treatment medium porous to treated fluid; and said input and said output hollow fibers adjacently spaced within said treatment medium such that said fluid to be treated passes through said porous walls of said input hollow fibers to contact said treatment medium forming treated fluid and said treated fluid passes through said porous walls of said output hollow fibers for discharge from said contactor.

14. A hollow fiber contactor according to claim 13 wherein said input hollow fibers are in alternately spaced relation with said output hollow fibers.

15. A hollow fiber contactor according to claim 13 wherein said input hollow fibers open ends are in communication with a input manifold at one end of said contactor and said output hollow fibers open ends are in communication with a output manifold at an opposite end of said contactor.

16. A hollow fiber contactor according to claim 13 wherein said input hollow fiber open ends are in communication with a input manifold at one end of said contactor and said output hollow fiber open ends are in communication with a output manifold at the same end of said contactor.

17. A composite sheet structure for treatment of fluid, comprising: a barrier sheet non-permeable to fluid to be treated and to treated fluid; a layer of treatment medium adjacent one side of said barrier sheet which is inert to said treatment medium; and within said layer of treatment medium a woven sheet structure comprising a plurality of input hollow fibers open at one end and closed at their opposite end and a plurality of output fibers open at one end and closed at their opposite end, said input hollow fibers and said output hollow fibers having at least a portion of their side walls porous to fluid to be treated and treated fluid, respectively; said input hollow fibers and said output hollow fibers in spaced relation; a plurality of spaced substantially smaller diameter fibers in woven relationship with said input and output hollow fibers forming a composite layered sheet fluid contactor structure.

18. A composite sheet structure for treatment of fluid according to claim 17 wherein said input hollow fibers are in alternately spaced relation with said output hollow fibers.

19. A composite sheet structure for treatment of fluid according to claim 17 wherein said input hollow fiber open ends are at one end of said composite sheet structure and said output hollow fiber open ends are at the opposite end of said composite sheet structure.

20. A composite sheet structure for treatment of fluid according to claim 17 wherein said input hollow fiber open ends and said output hollow fiber open ends are at the same end of said composite sheet structure.

21. A packing for a hollow fiber contactor for treatment of fluid, comprising: a spiral wound composite sheet structure, said composite woven sheet structure comprising a barrier sheet non-permeable to fluid to be treated and to treated fluid; a layer of treatment medium adjacent one side of said barrier sheet which is inert to said treatment medium; and within said layer of treatment medium a woven sheet structure comprising a plurality of input hollow fibers open at one end and closed at their opposite end and a plurality of output fibers open at one end and closed at their opposite end, said input hollow fibers and said output hollow fibers having at least a portion of their side walls porous to fluid to be treated and treated fluid, respectively; said input hollow fibers and said output hollow fibers in spaced relation; a plurality of spaced substantially smaller diameter fibers in woven relationship with said input and output hollow fibers forming a composite layered sheet fluid contactor structure.

22. A packing for a hollow fiber contactor according to claim 21 wherein said input hollow fibers are in alternately spaced relation with said output hollow fibers.

23. A packing for a hollow fiber contactor according to claim 21 wherein said input hollow fiber open ends are at one end of said spiral wound composite sheet structure and said output hollow fiber open ends are at the opposite end of said spiral wound composite sheet structure.

24. A packing for a hollow fiber contactor according to claim 21 wherein said input hollow fiber open ends and said output hollow fiber open ends are at the same end of said spiral wound composite sheet structure.

25. A packing for a hollow fiber contactor according to claim 21 wherein said spiral wound composite sheet structure is wound around a central core inert to said fluids and said treatment medium.

26. A packing for a hollow fiber contactor according to claim 21 wherein said treatment medium is selected from the group consisting of a catalyst for conduct of a chemical reaction and a sorbent for conduct of an adsorption process.

* * * * *